United States Patent [19]

Kramer et al.

[11] 4,171,920
[45] Oct. 23, 1979

[54] TORSION SPRING MEANS

[75] Inventors: James H. Kramer, Fairlawn; Roy L. Orndorff, Jr., Kent, both of Ohio

[73] Assignee: The B. F. Goodrich Company, Akron, Ohio

[21] Appl. No.: 850,431

[22] Filed: Nov. 10, 1977

[51] Int. Cl.² .............................................. F16D 3/00
[52] U.S. Cl. ................................... 403/223; 64/11 B; 64/27 R; 267/57.1 A; 267/153; 267/154
[58] Field of Search .............. 267/57.1 R, 57.1 A, 267/153, 154, 63 A; 403/223, 228, 288; 64/27 NM, 27 R, 30 C, 30 D, 11 R, 11 B

[56] References Cited

U.S. PATENT DOCUMENTS

| | | | |
|---|---|---|---|
| 2,571,267 | 10/1951 | Ljunggren | 64/27 NM X |
| 2,690,335 | 9/1954 | Ballard | 267/57.1 R X |
| 2,783,822 | 3/1957 | Hickman et al. | 267/57.1 R X |
| 2,908,150 | 10/1959 | Stern | 64/11 R |
| 3,313,579 | 4/1967 | Seidenfeld | 308/240 X |
| 3,855,817 | 12/1974 | Stuemky et al. | 64/11 B X |
| 3,905,208 | 9/1975 | Oyama et al. | 64/11 R |

FOREIGN PATENT DOCUMENTS 1000691  8/1965  United Kingdom ............. 64/11 R

*Primary Examiner*—George E. A. Halvosa
*Attorney, Agent, or Firm*—Joseph Januszkiewicz

[57] ABSTRACT

A replaceable torsion type spring assembly or unit having a resilient elastomeric tubular member with one end of such tubular member secured to a stationary member and the other end of such tubular member secured to a member that has force applied thereto for rotating such last member. A hollow tubular member is loosely journaled internally of the resilient elastomeric tubular member to provide support to the spring assembly.

6 Claims, 3 Drawing Figures

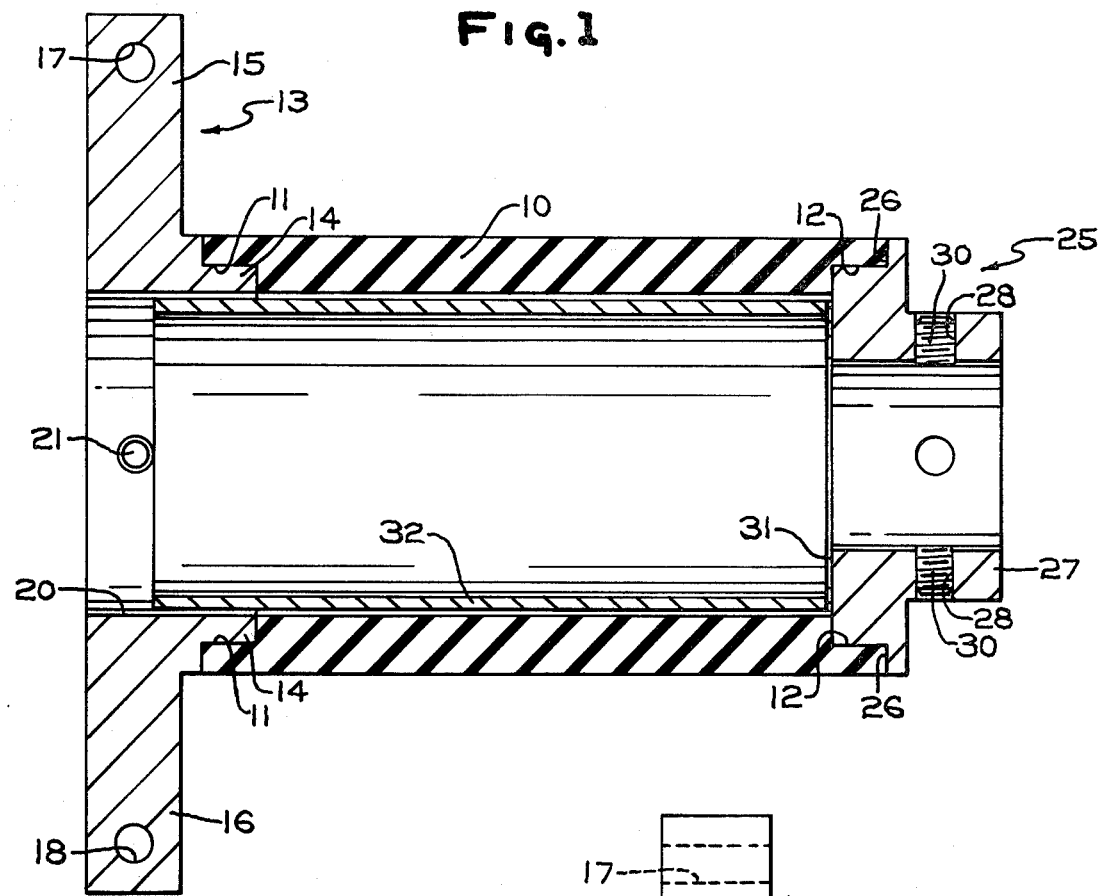
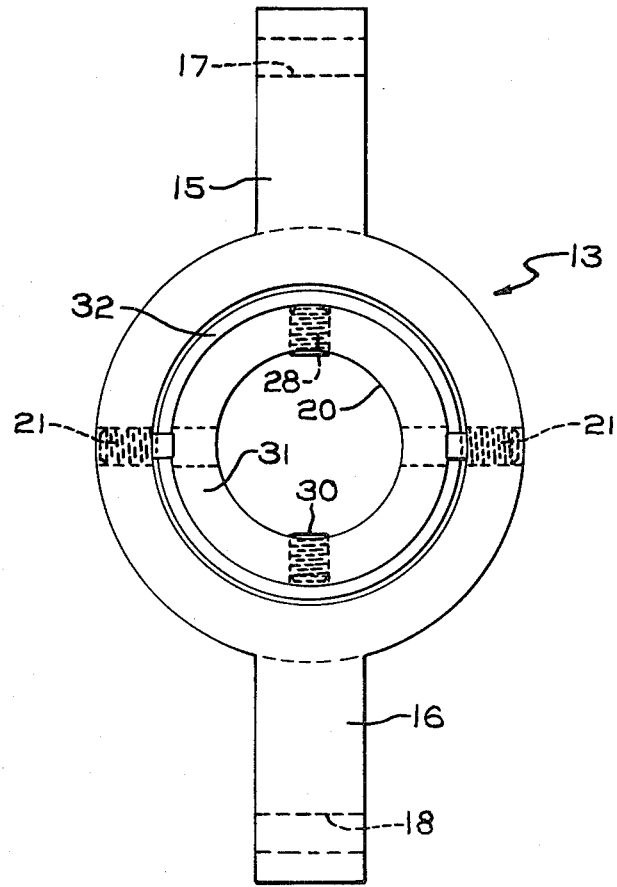

TORSION SPRING MEANS

BACKGROUND OF THE INVENTION

This invention relates to a replaceable torsion assembly or unit and more particularly to a tubular resilient member attached at opposite ends to members which are generally made of metal and internally supported by a tubular member to provide a spring assembly.

Heretofore, torsion units have been made by concentrically positioning cylindrical sleeves of metal of different diameters and securing the resilient material therebetween. The inner metal sleeve is secured to a first element such as an axle, which is to be resiliently carried for torsional movement and the outer cylindrical sleeve is secured to another or second element such as a housing and with respect to which the first element (such as an axle) has relative torsional movement.

Limitation in the actual application of these units are encountered where large relative movement between the elements or members is required. In these instances rubber torsion springs in series or metal coil springs or groups of springs have been used exclusively to take care of the excessive travel. These solutions are heavy and bulky. The instant invention employs a novel combination of elements with an elongated cylindrical rubber member to provide for an unusual result in spring assemblies.

The invention provides a practical and economical means for overcoming an otherwise awkward impractical construction where a large torsional movement is required with a relatively low spring rate.

The term resilient material as employed in this specification and in the claims includes any of a variety of elastomeric materials and, specifically, natural rubber in any of its compounded forms, artificial or synthetic rubber in any of its various forms and any similar materials.

SUMMARY OF THE INVENTION

The present invention contemplates an elastic spring means wherein an elongated hollow elastomeric member has one end joined to tubular metal member and the other end secured to a stationary tubular member with a loosely-fitting internal tubular member loosely supporting the hollow elastomeric member. The spring means has a low spring rate (as in pounds force per inch of deflection) providing a substantial means for permitting relatively large travel of a rotary member relative to the stationary member, yet assuring a positive return to the initial starting position without undue force.

DESCRIPTION OF THE DRAWINGS

FIG. 1 is a side elevational view in cross sectional of the invention;

FIG. 2 is a front elevational view of the invention.

DETAILED DESCRIPTION

Figure 3:
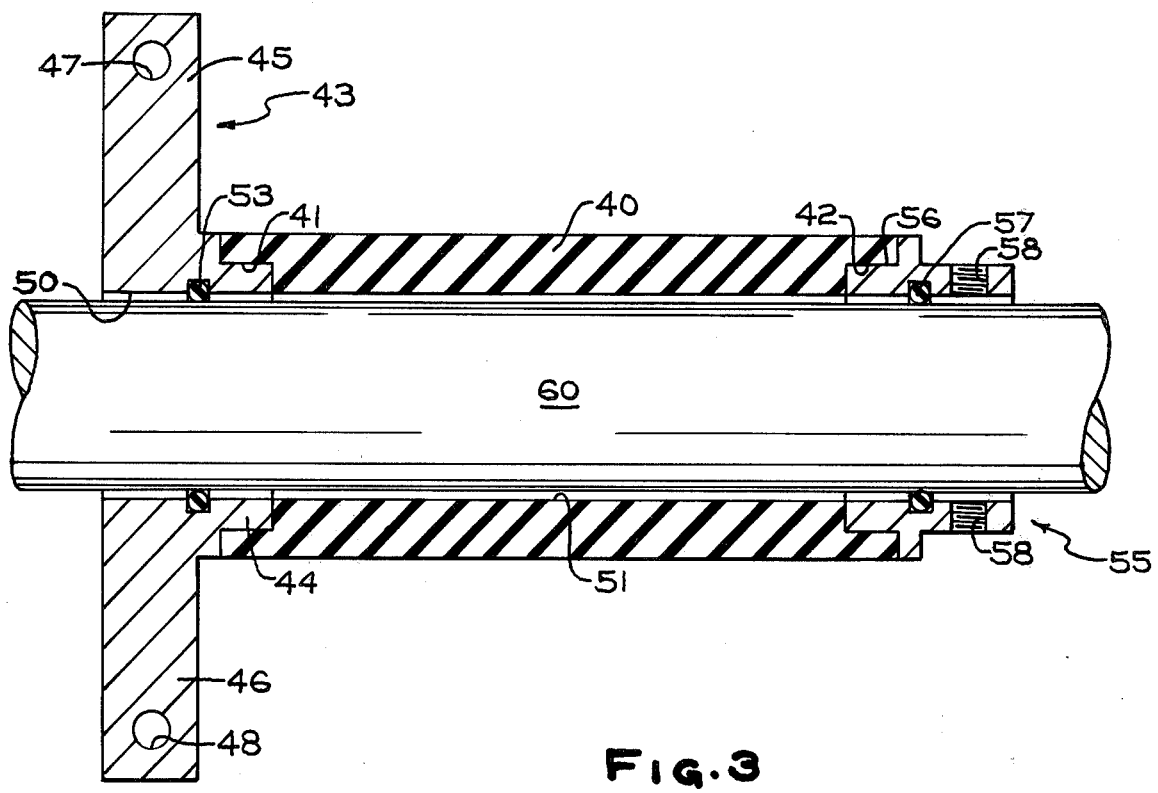
FIG. 3 is a side elevation view in cross section of a modification of the invention.

Referring now to the drawings, wherein like reference numerals designate like or corresponding parts throughout the several views, there is shown in FIG. 1 a hollow, generally cylindrical member 10 of suitable resilient material such as elastomeric material which is suitably recessed on its inner periphery at the respective ends as at 11 and 12.

An annular flanged member 13 having a projecting reduced end portion 14 is suitably secured as by bonding to the recessed end portion 11 of elastomeric cylindrical member 10. Flanged member 13 has a pair of outwardly extending side arm members or extensions 15 and 16 with bores 17 and 18 extending therethrough to provide means for attachment to a frame member. The central bore 20 of annular member 13 houses a set screw 21 that extends into the body portion of member 13 for a purpose to be described.

A disc-like annular member 25 is recessed at one end as at 26 such as to complimentary fit the other recessed end portion 12 and is suitably bonded thereto to firmly secure annular member 25 to elastomeric cylindrical member 10. Such other end of annular member 25 is also reduced as at 27, which reduced end portion has a plurality of circumferentially spaced radially extending threaded bores 28 extending therethrough. Set screws 30 are threadedly received by the threaded bores 28 to provide means for attaching the spring assembly to a rotatable shaft or movable member not shown. Annular member 25 has a flat annular surface 31 which is adapted to abuttingly engage one end of a tubular member or sleeve 32 that is loosely received by the central bore of the hollow resilient cylindrical member 10. The other end of tubular member or sleeve 32 abuttingly engages the set screw 21 thereby being captively held from axial movement within the spring assembly.

The respective annular member 13, disc-like annular member 25 and tubular member 32 are made of metal or plastic to provide a positive unyielding mass.

With the stationary tubular metal end piece or annular flanged member 13 joined via the elongated hollow elastomeric cylinder 10 to the axially spaced rotatable tubular metal end piece or annular member 25, the movable member yields easily to a torsion force since the elongated elastomeric member provides a relatively low spring rate since its length is substantially greater than the radial thickness of the material forming its wall portions as clearly shown in FIGS. 1 and 3. The loosely-fitting internal tubular member or sleeve 32 prevents the elongated elastomeric or rubber torsion tube 10 from buckling or wrinkling when twisted, yet permitting the twisting of the elongated elastomer member 10 over a wide arc or angle, yet providing assurance of a positive return to its initial starting position.

A modification of the invention is shown in in FIG. 3. A hollow cylindrical member 40 of resilient elastomeric or rubber material is suitably recessed on its inner periphery at the respective ends as at 41 and 42.

An annular flanged member 43 having a projecting reduced end portion 44 is suitably bonded to the recessed end portion 41 of the elastomeric member 40. Flanged member 43 has a pair of outwardly extending arm members or extensions 45 and 46 with bores 47 and 48 extending arm members or extensions 45 and 46 with bores 47 and 48 extending therethrough to provide means for attaching such member 43 to a stationary or rotary frame member. The inner wall surface of central bore 50 of flanged member 43 is substantially coextensive with the inner wall surface 51 of resilient cylindrical member 40 except for an annular recess therein which houses an annular seal 53.

A disc-like or annular member 55 is bonded to the other end portion of resilient cylindrical member 40. Member 55 is recessed at one end as at 56 to complimentary receive the other recessed end portion 42 and to which recessed end portion 42 member 55 is bonded.

The inner peripherial wall surface of disc-like member 55 is recessed to receive an annular seal 57. Member 55 has a plurality of circumferentially spaced threaded bores 58 to receive screws for connecting member 55 to a shaft 60 that extends through the respective bores of the annular flanged member 43, the elastomeric member 40, and the disc-like member 55 and frictionally engaged by the respective annular seals 53 and 57. The clearance space between the inner wall surface 51 of elastomeric member 40 and the outer wall surface of shaft 60 provides a clearance space which is packed with a suitably lubricant such as grease which is retained therein by seals 53 and 57. This particular embodiment operates in a similar manner as does the previously described embodiment and is particularly useful if the unit is small and space requirements are a premium. In this instance the shaft 60 may also be a stationary member with flanged member 43 being the rotating member. The functioning of the torsional unit is that one end of the unit such as member 43 is rotated while the other end of the torsional unit such as shaft 60 and disc-like member 55 is stationary. The torsional rate of the spring is a function of the rubber's shear modulus, the radial rubber thickness and the rubber axial length.

It will be apparent that, although a specific embodiment and certain modifications of the invention have been described in detail, the invention is not limited to the specifically illustrated and described constructions since variations may be made without departing from the principles of the invention.

We claim:

1. A replaceable spring assembly comprising a first annular member, an elongated longitudinally extending hollow cylindrical elastic member having a length substantially greater than the radial thickness of the elastic member's material and having one end bonded to said first member, a second annular member bonded to the other end of said elongated elastic hollow member, a shaft received within the central bore of said elongated hollow elastic member to provide a small clearance space therebetween, said shaft secured to said annular member, said first and second annular members being recessed on their respective inner peripheries, seals in each of said recesses frictionally engaging said shaft, and lubricant in said clearance space to support said elastic member in its movement relative to said shaft.

2. A replaceable spring assembly comprising an elongated longitudinally extending resilient tubular member, one end of said member secured to a first annular member, the other end of said member secured to a second annular member that is rotatable, a loosely fitting rigid tubular member located within said elongated tubular resilient member to maintain the shape of said resilient member as one of said annular members is rotated relative to said second annular member, and said loosely fitting tubular member being longer than said elongated tubular flexible member.

3. A replaceable spring assembly as set forth in claim 2 wherein said tubular resilient member is made of rubber.

4. A replaceable spring assembly comprising a first member for connection to a stationary support, an elongated longitudinally extending resilient hollow cylindrical member having one end bonded to said first member, a second member bonded to the other end of said elongated hollow member, a tubular sleeve loosely received within the central bore of said elongated hollow member, said hollow member abuttingly engaging one end of said second member, means secured to said first member for retaining said tubular sleeve within said hollow member, and said sleeve extending the full length of said hollow tubular member.

5. A replaceable spring assembly as set forth in claim 4 wherein said first member has means for securing said first member to a stationary member, and said second member has means for securing said second member to a rotatable member for imparting a twisting movement to said elongated resilient hollow cylindrical member.

6. A replaceable spring assembly as set forth in claim 5 wherein said elongated resilient hollow member is recessed at both of said ends, said first and second members being recessed to complimentary engage said recessed ends of said hollow member, and said hollow member being bonded to said first member and said second member at said recesses.

* * * * *